(No Model.)
J. A. DEUTHER.
METHOD OF AND APPARATUS FOR GENERATING GAS.
No. 576,955. Patented Feb. 9, 1897.
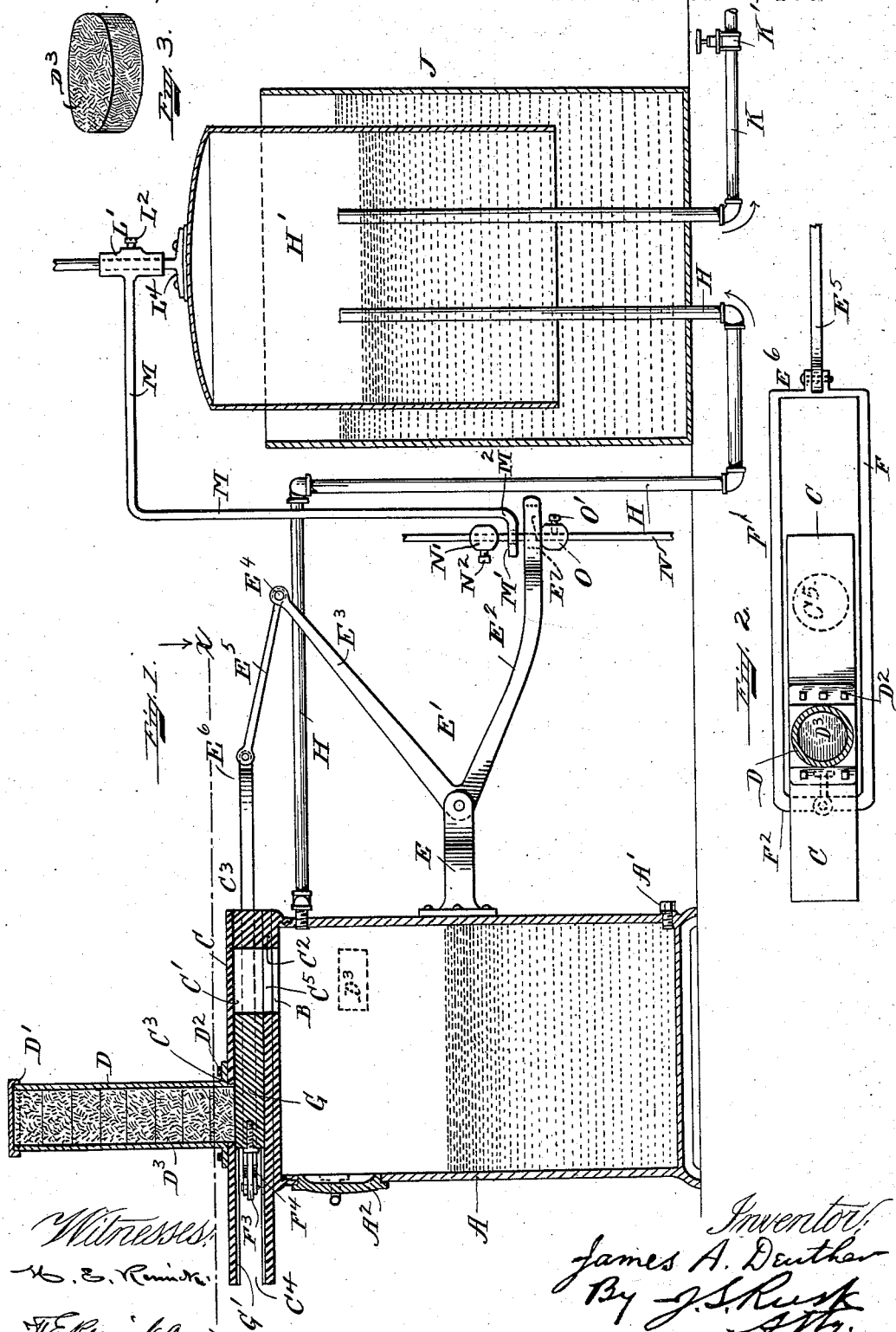
Witnesses
Inventor
James A. Deuther
By J. S. Rush
Atty.

UNITED STATES PATENT OFFICE.

JAMES A. DEUTHER, OF BOSTON, MASSACHUSETTS.

METHOD OF AND APPARATUS FOR GENERATING GAS.

SPECIFICATION forming part of Letters Patent No. 576,955, dated February 9, 1897.

Application filed July 13, 1896. Serial No. 599,025. (No model.) Patented in England September 17, 1896, No. 20,599.

*To all whom it may concern:*

Be it known that I, JAMES A. DEUTHER, of Boston, in the county of Suffolk and State of Massachusetts, have invented a new and useful Improvement in the Method of and Apparatus for Generating Gas, (for which I have obtained a patent in Great Britain, No. 20,599, bearing date September 17, 1896,) of which the following, taken in connection with the accompanying drawings, is a specification.

This invention relates to the generation of illuminating or other gas from calcium carbid or other chemical substances which, when treated with water or other liquid, generate a hydrocarbon or other gas.

The object of this invention is to automatically control the positive generation of a determined amount of gas by feeding a fixed quantity of the calcium carbid and adulterants to the water or other liquid contained in the generator in which the gas is generated.

The present automatic apparatuses for generating gas from certain chemical compounds which are decomposable by action of water or other liquids are either faulty or unsafe from the fact that such apparatuses depend upon the volume or pressure of gas so generated to control the access of water or other liquid to the said decomposable compounds. In other words, by limiting the supply of water admitted to said decomposable compounds it is endeavored to limit the amount of gas generated by the admission of water or other liquid to such compounds. In these devices, where the pressure or volume of gas generated is made use of in such manner to regulate the amount of gas to be generated, a further element of danger is presented from the fact that should the pressure or volume controlling the devices for an admission of water to the calcium carbid or analogous substances become inoperative such a quantity of gas may be generated as to render the generating apparatus a source of danger.

It is my purpose and object to practically and safely control the amount of gas to be generated by regulating the quantity of pure calcium carbid or analogous compounds to be brought into contact with water or other liquid, so that only so much gas is generated according to the fixed quantity of pure calcium carbid and adulterants as fed from time to time. It is my purpose and object to control the feeding of this fixed quantity of pure calcium carbid by regulating the operation of the feeding apparatus by the pressure or volume of gas so generated, which preferably may be stored in a gasometer, but not necessarily so, so that the calcium carbid is only fed as the pressure or volume of the gas generated decreases, and no calcium carbid is fed when the pressure or volume is above a certain point. From this it is obvious that it is impossible by my invention to continue generating an indefinite quantity of gas, because only a fixed quantity of pure calcium carbid and adulterants capable of generating a determined amount of gas is fed from time to time, which feeding depends upon the pressure or volume of the gas generated and stored preferably in the gasometer.

For carrying out my invention I take calcium carbid or other analogous substances adapted when treated with water or other liquid to evolve a hydrocarbon or other combustible gas and form it into tablets of definite form or weight and containing a definite amount of pure calcium carbid and adulterants, and as each tablet represents a fixed quantity of pure calcium carbid a determined quantity of gas is generated from each of said tablets when fed to the water or other liquid in the gas-generator. I take said calcium carbid or other analogous substances, whether produced in a solid form, either crystalline or as a mass, and pulverize the same, or if it is originally in an amorphous condition and by addition or otherwise have a product containing pure calcium carbid and adulterants, and place the same in molds of the size adapted to ultimate requirements. For instance, we have a mass of the substance and we take a mold holding, say, ten cubic inches. In said ten cubic inches I propose always to put, and by my process it is possible to put, such an amount of pure calcium carbid and adulterants as will generate an amount of gas to meet the ultimate requirements, and that is the proportioning of the amount of pure calcium carbid which said ten cubic inches is to contain. Taking, for instance, a house where there is only required a gasometer holding two cubic feet of gas to properly operate the feeding mechanism and fill requirements of said house, we will have such feeding mechanism drop in the apparatus of such a house a tablet capable only of generating an amount of gas that would not cause the said holder to blow or give a greater or less volume than is designated to operate the mechanism of that particular apparatus. Now it is clear that in such substances if one pound of the uniform calcium carbid and adulterants gives, say, four cubic feet of gas when decomposed by water then a certain weight of such uniform decomposable substance may be taken, when in a powdered condition, and compressed into tablets, which tablets being homogeneous will generate, when brought into contact with water or other liquid, a fixed amount of gas.

It will be readily understood that in order to feed a definite amount of calcium carbid or analogous substance it is preferable to put such a substance in a tablet form, each tablet representing by decomposition a definite volume of gas, and by means of suitable apparatus these tablets are fed from time to time, depending upon the pressure or volume of the gas generated.

It will be understood that while it is preferable to feed the material in a tablet form yet the powdered substance can be fed to the water in the generating-chamber in any suitable receptacle without being compressed, it being understood, however, that said receptacle is capable of holding a definite quantity of such substance, which, upon decomposition by contact with water or other liquid, gives a definite volume of gas.

The process of treating calcium carbid or analogous substances to make the same of uniform composition and mixing therewith a binding material and forming the same preferably into tablets, each tablet representing by decomposition a determined volume of gas, and also the generation of gas from the calcium carbid treated as just described, are not claimed in this application, but form the subject-matter of another application filed by me on the 13th day of July, 1896, Serial No. 599,024.

In the accompanying drawings, Figure 1 is a central vertical section through the gas-generating chamber and gasometer and with other parts in elevation. Fig. 2 is a plan view taken on the line X X of Fig. 1. Fig. 3 is an enlarged detail view in perspective of one of the tablets of calcium carbid or analogous substance.

Like letters of reference refer to like parts throughout the several views.

A represents a gas-generating chamber constructed, preferably, of steel or other suitable material of sufficient strength and provided with a tap-hole closed by a plug $A'$ and an opening near the top provided with a cover $A^2$. In the top of said generator there is provided an opening or port B for the purpose hereinafter described. Over the top of said chamber and secured thereto there is located a chamber C, closed on the sides and at the end $C^3$ to prevent escape of gas and open at the end $C^4$, and having an upper plate $C'$ and a lower plate $C^2$, and in the lower plate $C^2$ there is a port $C^5$, which registers with the port B.

Secured to the top plate $C'$ there is a hopper D, having a suitable cover $D'$ and a series of bolts $D^2$, which secure said hopper to the top plate $C'$. The bottom of said hopper is open and communicates with the chamber C, and in said hopper there are located a number of tablets $D^3$ of calcium carbid or analogous substance, which are adapted, as hereinafter described, to drop into said chamber C and then to be pushed forward toward the ports B and $C^5$ by the piston G in its reciprocations in said chamber C. This hopper containing the carbid is at all times out of contact with the vapor or liquid in the gas-generating chamber or the gas generated by the decomposition of the calcium carbid or analogous compound, so that the calcium carbid or analogous compound is not disintegrated until brought into contact with the liquid in the gas-generating chamber. To the rear end of said piston there is secured a rod $F^4$, which extends rearwardly and is pivotally connected at $F^3$ to the cross-arm $F^2$ of the horizontal arms F and $F'$, which are on opposite sides of the chamber C, and at their front ends form a cross-bar $E^6$, to which is pivotally connected the arm $E^5$, which in turn is pivotally connected at $E^4$ to the arm $E^3$ of the bell-crank lever $E'$, pivoted to a standard E, secured to the generator A, and the lower arm $E^2$ of said bell-crank lever is provided with a slot $E^7$, in which is located the rod N, and on said rod N, below said slot, is an adjustable nut O, having a set-screw $O'$. The said rod N extends upwardly and passes through the slot $M'$ on the rod M, and above said rod there is located an adjustable nut $N'$, having a set-screw $N^2$. The said rod M is provided with a sleeve $L'$, and by means of a set-screw $L^2$ can be adjustably located on the vertical rod L. The said rod L at its lower end is provided with a flange $L^4$, which is riveted to the top of the bell $H'$ of the gasometer J, which bell is sealed in a liquid and capable of rising and falling according to the varying amount of gases stored therein.

The gas generated in the generator A passes by the pipe H to the bell $H'$ of the gasometer, and from the gasometer it is conducted for use by a pipe K, which has a suitable valve $K'$, which can be used to shut off the flow of the gas.

Supposing now that one of the tablets $D^3$ of calcium carbid or other analogous substance is dropped into the rectangular chamber C from the hopper D and has been pushed forward by the piston G (the apparatus of course being first started by hand) until it reaches the ports $C^2$ and B, whence it dropped into the water of the generator A, and the gas evolved by the calcium carbid or analogous substance coming into contact with the water passes over into the bell H' through the pipe H, and as the volume of the gas in the bell H increases it raises up said bell and the rod M, which acts on the said rod N, owing to the location of the nut N', and the said rod N, owing to the location of the nut O, acts on the lower arm E² of the bell-crank E' and causes the upper end of the arm E³ to move the arm E⁵, rods F and F', and the cross-arm F² to move rearwardly along the guides G', provided in the chamber C for guiding the piston G, and by means of said rods, as above described, the piston G is moved rearwardly until its front edge alines with the rear edge of the hopper D, when one of the tablets D³ will drop into the chamber C in front of the piston. Now so long as the volume of the gas is at a certain point the bell H' of the gasometer will remain in its raised position, but as the gas is used its volume decreases in proportion to the use, and the bell H' will slowly fall and with it the rods M and N, and the adjustable nut O, moving away from the arm E², will no longer support the same, and said arm E³ is moved downwardly by the lower end M² of the rod M as the bell H' and rod M move downwardly upon the decrease of volume of gas in said bell H', and in said downward movement the arm E² will move the arms E³ E⁵, rods F and F', and the piston G forwardly to the position shown in full lines, Fig. 1, and the tablet previously dropped into the chamber C in front of the piston G will fall into the water contained in the generator A, and the gas generated from the new tablet will pass over into the gasometer.

From the above it is clear that in the operation of my apparatus the feeding of the tablets of calcium carbid or analogous substance will be controlled by the pressure or volume of the gas generated, and, as previously described, each tablet represents by decomposition a definite volume of gas. Consequently it is clear that having a fixed amount of calcium carbid, which represents by decomposition a definite volume of gas, it is possible to provide generating apparatuses and to supply said generating apparatues with calcium carbid or analogous substance in such amounts as that each apparatus can be provided with tablets which generate a volume of gas required for such apparatus. For instance, in a house where there is only required a gasometer holding two cubic feet of gas to properly operate the feeding mechanism and fill the requirement of said house, the apparatus will be constructed to drop into the gas-generator of such a house a tablet capable of generating only two cubic feet of gas, which would not cause said gasometer to blow or to give a greater or less volume than required to operate the mechanism of the apparatus located in said house, and likewise for gasometers requiring three cubic feet of gas, four cubic feet of gas, and so on.

It will be understood that I do not limit myself to the construction of the apparatus shown and described, as it simply represents one form of apparatus in which my invention can be carried out.

Having thus ascertained the nature of my invention, what I claim as new is—

1. The herein-described process of generating acetylene gas which consists in first forming the carbid into compact bodies each containing a determined amount of carbid and capable of generating a determined amount of gas, and second in so storing such compact bodies with reference to a generator as to keep them out of contact with the liquid therein or vapor thereof, and third, in feeding such bodies to the liquid of the generator by mechanism operated by the volume of the gas in such manner that each feed of the carbid shall generate a determined amount of gas.

2. In a gas-generating apparatus, a gas-generating chamber for holding water or other liquid and provided with a gas-outlet, a receptacle for holding compact bodies of metallic-carbid compounds containing a determined amount of metallic carbid, and mechanism for automatically feeding said compact bodies of metallic-carbid compounds to said gas-generating chamber and adapted to be operated by the variations of the volume of the gas generated.

3. In a gas-generating apparatus, a gas-generating chamber for holding water or other liquid and having a gas-outlet, a gasometer with which said gas-outlet communicates and in which the gas generated is stored, a receptacle for holding compact bodies of metallic-carbid compounds capable of generating determined amounts of gas, and mechanism for feeding said compact bodies of metallic-carbid compounds to said gas-generating chamber and adapted to be operated by the variations of the volume of the gas in the gasometer.

4. In a gas-generating apparatus, a gas-generating chamber for holding water or other liquid and having a gas-outlet and a port through which metallic-carbid compounds are fed to said gas-generating chamber, a gasometer with which said gas-outlet communicates and in which the gas generated is stored, a chamber located on said gas-generating chamber and having a port registering with the port of said gas-generating chamber, a receptacle for holding compact bodies of metallic-carbid compounds and communicating with said chamber, and mechanism for feeding said compact bodies of metallic-carbid compounds to said gas-generating chamber and adapted to be operated by the variations of the volume of the gas in the gasometer.

5. In a gas-generating apparatus, a gas-generating chamber for holding water or other liquid, and having a gas-outlet and a port through which metallic-carbid compounds are fed to said gas-generating chamber, a gasometer with which said gas-outlet communicates and in which the gas generated is stored, a chamber located on said gas-generating chamber, a receptacle for holding compact bodies of metallic-carbid compounds and communicating with said chamber, and mechanism for feeding said compact bodies of metallic-carbid compounds to the gas-generating chamber and consisting of a piston adapted to feed said metallic-carbid compounds and devices coöperating with said piston to actuate the same and adapted to be operated by the variations of the volume of the gas in the gasometer.

In testimony whereof I have signed my name to this specification, in the presence of two subscribing witnesses, on this 27th day of May, A. D. 1896.

JAMES A. DEUTHER.

Witnesses:
A. LOUISE MESSER,
E. L. HARLOW.